United States Patent [19]

Kraushaar

[11] Patent Number: 4,542,988

[45] Date of Patent: Sep. 24, 1985

[54] REFLECTIVE FABRY-PEROT INTERFEROMETER

[75] Inventor: Robert J. Kraushaar, Tenafly, N.J.

[73] Assignee: ITT Corporation, New York, N.Y.

[21] Appl. No.: 592,050

[22] Filed: Mar. 22, 1984

[51] Int. Cl.⁴ .................................................. G01J 3/26
[52] U.S. Cl. ..................................... 356/352; 350/166
[58] Field of Search ....................... 356/352, 346, 246; 350/163, 166, 602

[56] References Cited

U.S. PATENT DOCUMENTS 3,834,790  9/1974  Macken ........................... 356/352 X

*Primary Examiner*—Vincent P. McGraw
*Assistant Examiner*—S. A. Turner
*Attorney, Agent, or Firm*—John T. O'Halloran; Robert P. Seitter

[57] ABSTRACT

The improved reflection Fabry-Perot interferometer includes the conventional pair of spaced parallel mirrors have a predetermined angle with respect to an incident light beam. The improvement includes third and fourth mirrors each disposed at a different end of the first and second mirrors at a second predetermined angle with respect to a line parallel to the incident light beam so as to reduce the end losses in the two parallel conventional mirrors and to reinforce the light beam emanating from the two conventional mirrors.

18 Claims, 1 Drawing Figure

U.S. Patent   Sep. 24, 1985   4,542,988
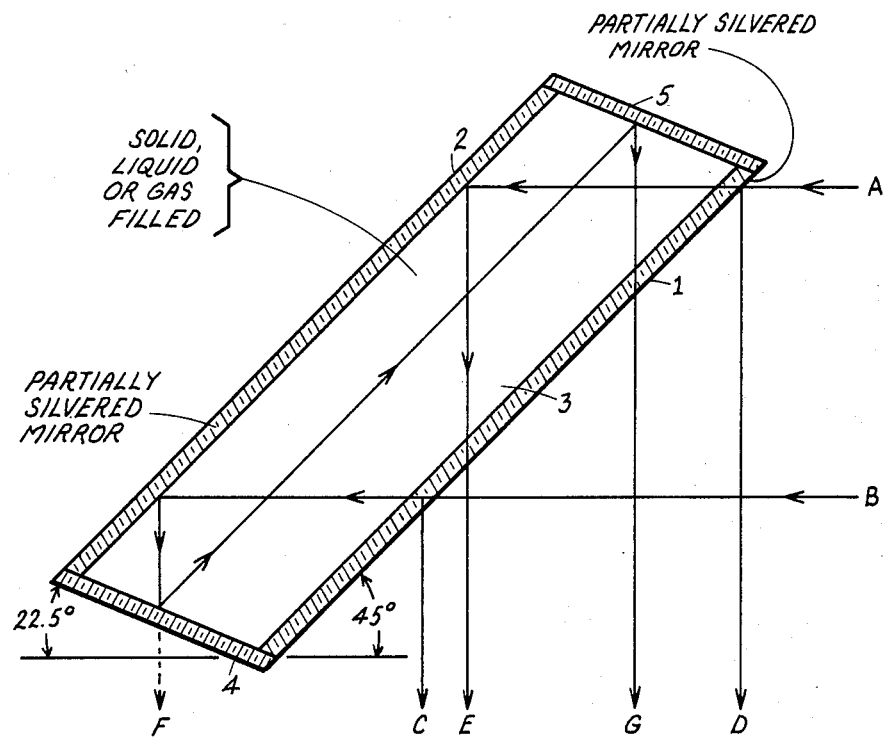

REFLECTIVE FABRY-PEROT INTERFEROMETER

BACKGROUND OF THE INVENTION

The present invention relates to interferometers of the Fabry-Perot type and more particularly to an improved reflective Fabry-Perot interferometer.

The Fabry-Perot interferometer is a multiple-beam interferometer normally consisting of two parallel plates of glass or quartz capable of light refraction separated a short-known distance and with the adjacent surfaces partially silvered so as to increase reflection without being fully opaque. This instrument is capable of very high resolution of two very close spectral lines.

The Fabry-Perot resonant cavity can also be used as a narrow wavelength band rejection element when used in the reflective mode.

The use of a non-moving element to cover the transitions associated with the wavelength region of interest may require a wider plate separation than normally employed in a movable mirror interferometer. Such an arrangement leads to a loss of portions of successive reflections in the resonant Fabry-Perot cavity through the edge of the cavity adjacent the ends of the two mirrors. The reason for this loss of light at the edge of the cavity is that the mirrors extend only a finite distance. This spoils the coherent multiple reflections necessary to create the extinction of unwanted wavelengths, in the reflective mode, at angles other than normal incidence.

SUMMARY OF THE INVENTION

An object of the present invention is to provide an improved reflective Fabry-Perot interferometer.

Still another object of the present invention is to provide an improved Fabry-Perot resonant cavity which may be used as a wavelength rejection element.

A feature of the present invention is the provision of an improved Fabry-Perot resonant cavity comprising: a first mirror partially transparent disposed at a first predetermined angle with respect a given axis; a second mirror partially transparent spaced from and parallel to the first mirror, the first and second mirrors enabling reflection of light therebetween to produce a light beam emanating from one of the first and second mirrors; a third mirror disposed at one end of the first and second mirrors at a second predetermined angle with respect to a line parallel to said given axis; and a fourth mirror disposed at the other end of the first and second mirrors parallel to the third mirror, the third and fourth mirrors reflecting light attempting to escape from between the ends of the first and second mirrors to reinforce the light beam.

Another feature of the present invention is the provision of an improved Fabry-Perot interferometer comprising: a first mirror partially transparent disposed at a first predetermined angle with respect to a parallel beam of light incident thereon; a second mirror spaced from and parallel to the first mirror, the first and second mirrors enabling reflection of the light therebetween to produce a light beam emanating from the first mirror; a third mirror disposed at one end of the first and second mirrors at a second predetermined angle with respect to a line parallel to the incident light beam; and a fourth mirror disposed at the other end of the first and second mirrors parallel to the third mirror, the third and fourth mirrors reflecting light attempting to escape from between the ends of the first and second mirrors to reinforce the emanating light beam.

BRIEF DESCRIPTION OF THE DRAWING

Above-mentioned and other features and objects of this invention and the manner of obtaining them will become more apparent by reference to the following description taken in conjunction with the accompanying drawing, the single FIGURE of which is a schematic illustration of an improved Fabry-Perot resonant cavity which may be employed as an interferometer or a wavelength rejection element in accordance with the principles of the present invention.

DESCRIPTION OF THE PREFERRED EMBODIMENTS

Referring to the FIGURE, there is illustrated therein an interferometer of the Fabry-Perot type including a first mirror 1 disposed at a predetermined angle, such as 45°, as shown in FIG. 1 relative to a parallel beam of light, such as beam A-B impinging thereon. Mirror 1 is partially silvered so at to permit transmission of the light radiation and also to enable reflection of the light radiation. Parallel to mirror 1 is a second mirror 2 spaced from mirror 1 to provide a gap 3 therebetween. For operation in the infrared region, gap 3 may be filled with a gas, such as air, a solid, such as germanium or cadmium telluride silicon or a liquid, such as cyclohexane or carbon disulfide.

At mirror 1, a portion of the incident beam A-B is reflected as an emanating beam C-D. The remainder of the incident beam A-B passes through the gap 3 and eventually intercepts the partially silvered surface of mirror 2. This radiation is also partially reflected and at least a portion thereof may be expected to emerge as a ray E in the parallel beam C-D. However, some of the radiation will attempt to leak from between the two finite mirrors 1 and 2 as represented by ray F shown dotted. To eliminate this loss, a mirror 3 is aligned adjacent one end of mirrors 1 and 2 to redirect ray F between and parallel to mirrors 1 and 2. The angle between mirror 3 and a line parallel to the incoming radiation required for the 45° incidence on mirror 1 is 22.5°. A mirror 4 which is parallel to mirror 3 disposed at the other end of mirrors 1 and 2 redirected the reflected ray F to the reflected beam C-D, such as shown by ray G. The proper adjustment of these mirrors resulted in mirrors 1 and 2 appearing to extend indefinitely and the edge losses are substantially reduced.

The FIGURE is presented as a representative case. In actuality this particular embodiment represents a gaseous cell with the radiation entering from a corresponding medium at the indicated, $\theta=45°$, incidence. This situation leads to the angle $X=22.5°$ shown in the FIGURE. When a relative refractive index n other than 1 is involved, i.e. for the case of a solid etalon of germanium the angle of refraction in the etalon is no longer $\theta_2=45°$. From Snell's law $\sin\theta_2 = 1/n \sin\theta_1$ resulting in a more general solution $\chi=\theta_1-\frac{1}{2}\sin^{-1}(\sin\theta_1/n)$. To illustrate for germanium with the angle $\theta_1=45°$, the index of refraction, $n=4$, there is obtained the angle $\chi=39.9°$ rather than the angle $\chi=22.5°$.

It should also be clear that additional reflective bounce pairs at beyond critical angle on the interior of the transmitting surfaces are also permissible modes that can be excited with minor deviations from the nominal 45° incidence angle depicted in the FIGURE.

While I have described above the principles of my invention in connection with specific apparatus, it is to be clearly understood that this description is made only by way of example and not as a limitation to the scope of my invention as set forth in the accompanying claims.

I claim:

1. An improved reflective Fabry-Perot resonant cavity comprising:
   a first mirror partially transparent disposed at a first predetermined angle with respect to a given axis;
   a second mirror partially transparent spaced from and parallel to said first mirror, said first and second mirrors enabling reflection of light therebetween to produce a light beam emanating from one of said first and second mirrors;
   a third mirror disposed at one end of said first and second mirrors at a second predetermined angle with respect to a line parallel to said given axis; and
   a fourth mirror disposed at the other end of said first and second mirrors parallel to said third mirror, said third and fourth mirrors reflecting light attempting to escape from between said ends of said first and second mirrors to reinforce said light beam.

2. A resonant cavity according to claim 1, wherein said first predetermined angle is 45°.

3. A resonant cavity according to claim 2, wherein said second predetermined angle is 22.5°.

4. A resonant cavity according to claim 3, wherein a solid material is disposed between said first and second mirrors.

5. A resonant cavity according to claim 3, wherein a liquid material is disposed between said first and second mirrors.

6. A resonant cavity according to claiim 3, wherein a gaseous material is disposed between said first and second mirrors.

7. A resonant cavity according to claim 1, wherein a solid material is disposed between said first and second mirrors.

8. A resonant cavity according to claim 1, wherein a liquid material is disposed between said first and second mirrors.

9. A resonant cavity according to claim 1, wherein a gaseous material is disposed between said first and second mirrors.

10. An improved reflective Fabry-Perot interferometer comprising:
    a first mirror partially transparent disposed at a first predetermined angle with respect to a parallel beam of light incident thereon;
    a second mirror spaced from and parallel to said first mirror, said first and second mirrors enabling reflection of said light therebetween to produce a light beam emanating from said first mirror;
    a third mirror disposed at one end of said first and second mirrors at a second predetermined angle with respect to a line parallel to said incident light beam; and
    a fourth mirror disposed at the other end of said first and second mirrors parallel to said third mirror, said third and fourth mirrors reflecting light attempting to escape from between said ends of said first and second mirrors to reinforce said emanating light beam.

11. An interferometer according to claim 10, wherein said first predetermined angle is 45°.

12. An interferometer according to claim 11, wherein said second predetermined angle is 22.5°.

13. An interferometer according to claim 12, wherein a solid material is disposed between said first and second mirrors.

14. An interferometer according to claim 12, wherein a liquid material is disposed between said first and second mirrors.

15. An interferometer according to claim 12, wherein a gaseous material is disposed between said first and second mirrors.

16. An interferometer according to claim 10, wherein a solid material is disposed between said first and second mirrors.

17. An interferometer according to claim 10, wherein a liquid material is disposed between said first and second mirrors.

18. An interferometer according to claim 10, wherein a gaseous material is disposed between said first and second mirrors.

* * * * *